US008982001B2

(12) United States Patent
Taniguchi et al.

(10) Patent No.: US 8,982,001 B2
(45) Date of Patent: Mar. 17, 2015

(54) INFORMATION PROCESSING APPARATUS

(75) Inventors: Kazuki Taniguchi, Nagano (JP); Koichi Yamaguchi, Kanagawa (JP); Nobuhiro Kumae, Nagano (JP)

(73) Assignee: Sony Corporation, Tokyo (JP)

( * ) Notice: Subject to any disclaimer, the term of this patent is extended or adjusted under 35 U.S.C. 154(b) by 797 days.

(21) Appl. No.: 12/945,316

(22) Filed: Nov. 12, 2010

(65) Prior Publication Data

US 2011/0156966 A1    Jun. 30, 2011

(30) Foreign Application Priority Data

Dec. 28, 2009    (JP) .............................. 2009-298873

(51) Int. Cl.
*H01Q 1/24* (2006.01)
*H01Q 1/38* (2006.01)
*H01Q 9/04* (2006.01)
*G06F 1/16* (2006.01)
*H01Q 1/22* (2006.01)

(52) U.S. Cl.
CPC ............ *H01Q 9/0407* (2013.01); *G06F 1/1698* (2013.01); *H01Q 1/2266* (2013.01)
USPC .................... 343/702; 343/700 MS (58) Field of Classification Search
CPC .................................. H01Q 1/38; H01Q 1/24
USPC ......... 343/702, 700 MS; 361/679.26, 679.27; 455/575.1–575.7
See application file for complete search history.

(56) References Cited

U.S. PATENT DOCUMENTS

| 4,709,240 | A | * | 11/1987 | Bordenave ..................... 343/772 |
| 5,343,214 | A | * | 8/1994 | Hadzoglou ................... 343/713 |
| 7,261,240 | B2 | | 8/2007 | Akiho et al. |
| 7,331,529 | B2 | | 2/2008 | Itoshiro et al. |
| 7,520,442 | B2 | | 4/2009 | Itoshiro et al. |
| 7,538,731 | B2 | * | 5/2009 | Wong et al. .................... 343/702 |
| 7,764,236 | B2 | * | 7/2010 | Hill et al. ....................... 343/702 |
| 7,999,748 | B2 | * | 8/2011 | Ligtenberg et al. ........... 343/702 |
| 8,228,238 | B2 | * | 7/2012 | Thiam et al. ........... 343/700 MS |
| 2003/0017324 | A1 | * | 1/2003 | Chao et al. ................. 428/317.9 |
| 2008/0284663 | A1 | * | 11/2008 | Arima et al. ................... 343/702 |

FOREIGN PATENT DOCUMENTS

JP        2005-217946        8/2005

* cited by examiner

*Primary Examiner* — Michael C Wimer
*Assistant Examiner* — Hasan Islam
(74) *Attorney, Agent, or Firm* — Oblon, McClelland, Maier & Neustadt, L.L.P.

(57) ABSTRACT

Provided is an information processing apparatus including a keyboard portion, a first antenna module, and a connection portion. The keyboard portion includes a base plate to support a plurality of key portions, and a reinforcing member having an electric conductivity to be stacked on and reinforce the base plate. The first antenna module includes an antenna electrode to generate an induced electric field, and a ground portion to electrically connect to the antenna electrode. The connection portion is electrically connected to the ground portion and the reinforcing member.

8 Claims, 10 Drawing Sheets

INFORMATION PROCESSING APPARATUS

BACKGROUND OF THE INVENTION

1. Field of the Invention

The present invention relates to an information processing apparatus installing an antenna module for non-contact communication.

2. Description of the Related Art

As one of communication methods between electronic apparatuses, non-contact communication has been used more and more. The non-contact communication is a communication method of communicating information by using not a communication line, but an electric field. In particular, the non-contact communication is utilized in a relatively short communication distance ranging from several centimeters to several meters. As the non-contact communication, one that uses a radiated electric field, that is, a radio wave has been mainly used. The non-contact communication is used for RFID (Radio Frequency Identification), data communication, or the like.

When an antenna module for the non-contact communication is installed in an electronic apparatus such as a personal computer, there is a need to take into consideration an effect with respect to the radiated electric field due to other electronic parts accommodated in the electronic apparatus. For example, Japanese Patent Application Laid-open No. 2005-217946 (paragraph [0056], FIG. 9) (hereinafter, referred to as Patent Literature 1) discloses a portable information-processing terminal apparatus having a structure for reducing the effect with respect to the radiated electric field due to the other electronic parts. In the apparatus described in Patent Literature 1, a metal plate and a magnetic plate are stacked on an antenna coil for generating a radiated electric field, to thereby control variation of a resonance frequency due to the other electronic parts.

SUMMARY OF THE INVENTION

In recent years, non-contact communication using not the radiated electric field, but an induced electric field has been developed. In the non-contact communication using the induced electric field, a communication speed is higher than that in the non-contact communication using the radiated electric field, and hence it is possible to perform communication of large volume data. The installation of an antenna module using the above-mentioned induced electric field into an electronic apparatus in the same manner as that for the antenna module using the radiated electric field is unsuitable for the following reason. That is, the resonance frequency of the antenna module using the radiated electric field is varied when the antenna module using the radiated electric field is connected to the ground, while the antenna module using the above-mentioned induced electric field provides a current-amplifying effect when the antenna module using the above-mentioned induced electric field is connected to the ground.

In view of the circumstances as described above, there is a need for providing an information processing apparatus capable of performing non-contact communication using an induced electric field in a good state.

According to an embodiment of the present invention, there is provided an information processing apparatus including a keyboard portion, a first antenna module, and a connection portion.

The keyboard portion includes a base plate to support a plurality of key portions, and a reinforcing member having an electric conductivity to be stacked on and reinforce the base plate.

The first antenna module includes an antenna electrode to generate an induced electric field, and a ground portion to electrically connect to the antenna electrode.

The connection portion is electrically connected to the ground portion and the reinforcing member.

In the first antenna module to perform communication using the induced electric field, an impedance converter circuit is formed when the antenna electrode is connected to the ground, and an output current of an opposed antenna electrode is amplified as compared to an input current to the antenna electrode. That is, the antenna electrode and the ground are connected to each other, and thus a large induced electric field is induced and a transmission efficiency for the communication is improved. According to the above-mentioned configuration, in the information processing apparatus, it is possible to set the reinforcing member of the keyboard portion having a relatively large area to serve as the ground for the antenna electrode, and hence it is possible to further improve the transmission efficiency for the communication.

The connection portion may include an antenna module base plate and a shield plate. The antenna module base plate has an electric conductivity and supports the first antenna module. The shield plate shuts out an unnecessary radiation.

With this configuration, in addition to the reinforcing member of the keyboard portion, the shield plate can be set to serve as the ground, and hence it is possible to further improve the transmission efficiency for the communication.

The information processing apparatus may further include a second antenna module including an antenna coil to generate a radiated electric field. The first antenna module and the second antenna module may be integrated to each other as an antenna unit and may be provided on the antenna module base plate. The shield plate may include an opening and a cutout portion. The opening is opposed to the antenna unit. The cutout portion is used for forming a loop portion into a shape partially surrounding an outer peripheral portion of the opening.

No communication interference is generated between the first antenna module using the induced electric field for the communication and the second antenna module using the radiated electric field for the communication, and hence it is possible to integrate the first antenna module and the second antenna module as the antenna unit. In order to prevent the induced electric field generated by the antenna electrode or the radiated electric field generated by the antenna coil from being shut out, the shield plate is provided with the opening open to the antenna unit. Here, although, in a case where the loop of the shield plate is formed so as to entirely surround the circumstance when the opening is provided, the resonance frequency of a high frequency radiating from the antenna coil is varied, the provision of the cutout portion prevents, according to the above-mentioned configuration, the loop from being formed and hence it is possible to prevent the resonance frequency from being varied.

The first antenna module may perform communication with a main frequency band of 4.48 GHz.

With this configuration, the first antenna module is allowed to perform communication at high speed and low consumed power.

According to another embodiment of the present invention, there is provided an information processing apparatus includes a keyboard portion, a first antenna module, and a connection portion.

The keyboard portion includes a base plate to support a plurality of key portions, and a drip-proof sheet having an electric conductivity to be stacked on the base plate and prevent liquid drops from dripping from the plurality of key portions.

The first antenna module includes an antenna electrode to generate an induced electric field, and a ground portion to electrically connect to the antenna electrode.

The connection portion is electrically connected to the ground portion and the drip-proof sheet.

With this configuration, the drip-proof sheet of the plurality of key portions having a relatively large area in the information processing apparatus can be set to serves as the ground for the antenna electrode, and hence it is possible to further improve the transmission efficiency for the communication.

As described above, according to the embodiments of the present invention, it is possible to provide the information processing apparatus capable of performing non-contact communication using the induced electric field in a good state.

DESCRIPTION OF PREFERRED EMBODIMENTS

Hereinafter, an embodiment of the present invention will be described with reference to the drawings.

FIGS. 1A and 1B, FIGS. 2A and 2B, and FIGS. 3A to 3C are views each showing the appearance of an information processing apparatus 1 according to a first embodiment of the present invention.

The information processing apparatus 1 is a notebook personal computer and is constituted by a main body section 2 and a display section 3. The display section 3 is fixed so as to be capable of being opened/closed with respect to the main body section 2.

Figure 1A:
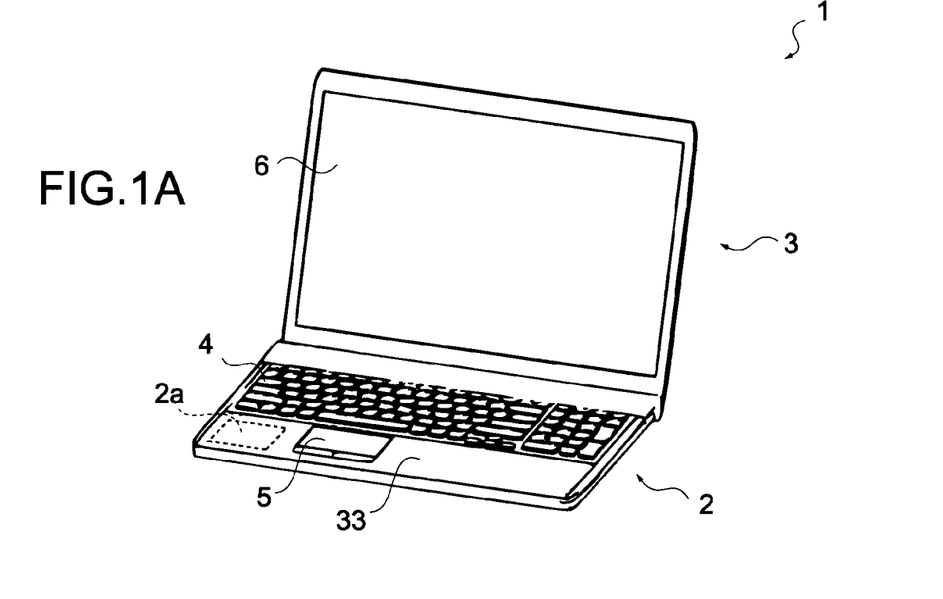
FIG. 1 are perspective views each showing the appearance of an information processing apparatus according to a first embodiment.
Figure 1B:
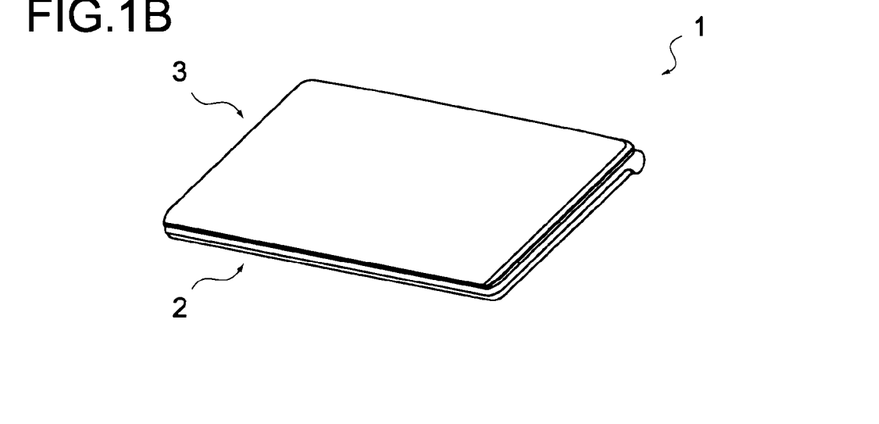
Figure 2A:
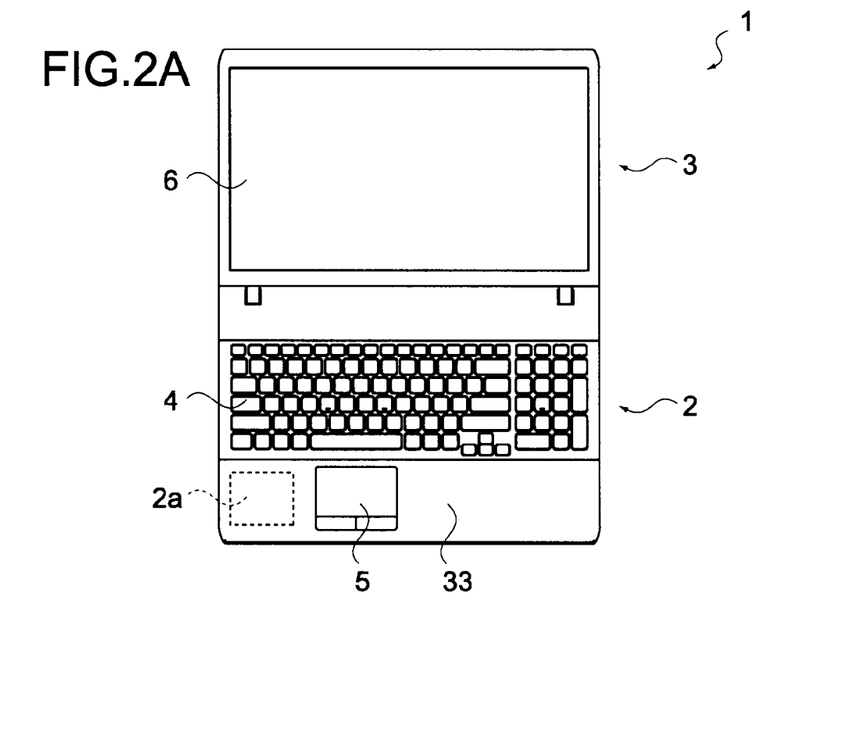
FIG. 2 are plan views each showing the appearance of the information processing apparatus according to the first embodiment.
Figure 2B:
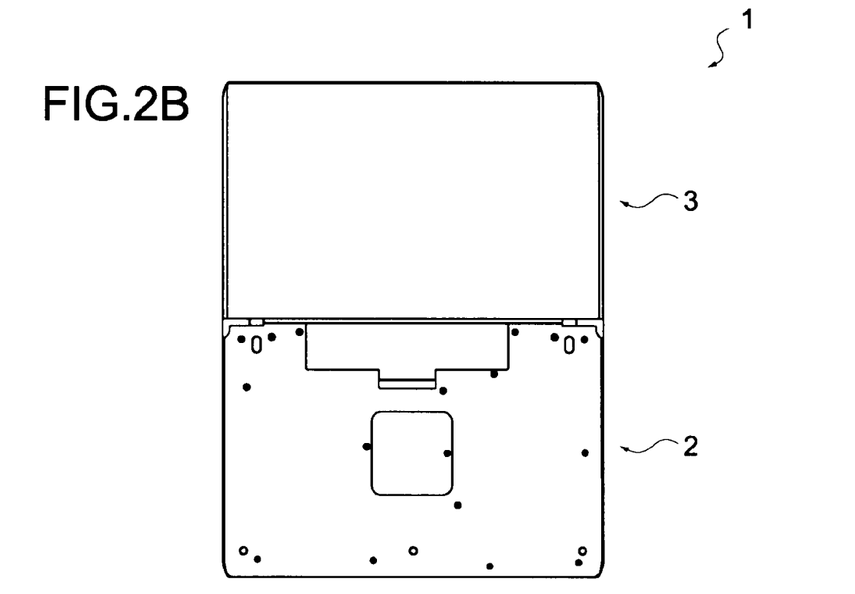
Figure 3A:
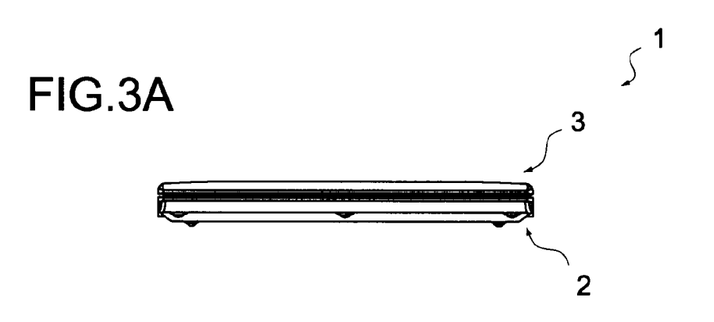
FIG. 3 are plan views each showing the appearance of the information processing apparatus according to the first embodiment.
Figure 3B:
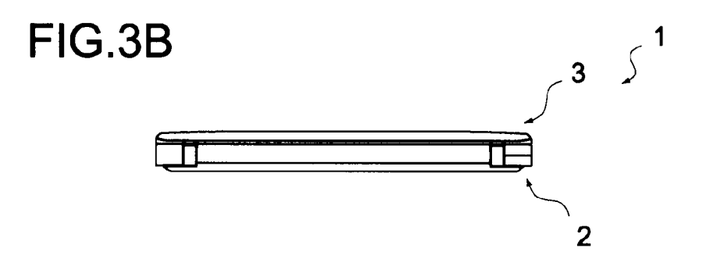
Figure 3C:
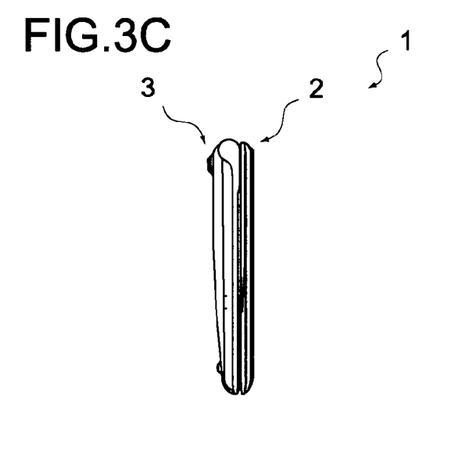
Figure 3D:
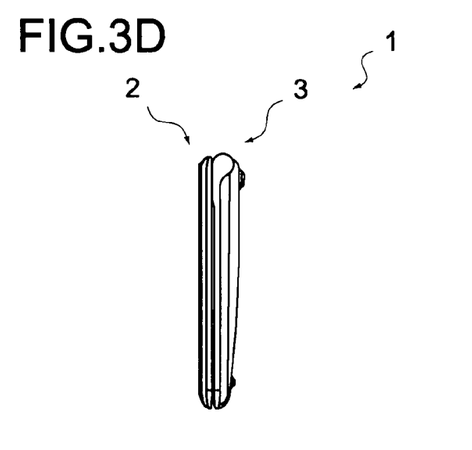

FIG. 1A is a perspective view of the information processing apparatus 1 with the display section 3 being opened. FIG. 1B is a perspective view of the information processing apparatus 1 with the display section 3 being closed. FIG. 2A is a plan view of the information processing apparatus 1 with the display section 3 being opened as viewed from the front side thereof. FIG. 2B is a plan view of the information processing apparatus 1 with the display section 3 being opened as viewed from the back side thereof. FIG. 3A is a plan view of the information processing apparatus 1 with the display section 3 being closed as viewed from the front side thereof. FIG. 3B is a plan view of the information processing apparatus 1 with the display section 3 being closed as viewed from the back side thereof. FIG. 3C is a plan view of the information processing apparatus 1 with the display section 3 being closed as viewed from the right side thereof. FIG. 3D is a plan view of the information processing apparatus 1 with the display section 3 being closed as viewed from the left side thereof.

As shown in the above-mentioned drawings, the main body section 2 includes a keyboard portion 4 and a palm rest portion 33. The palm rest portion 33 includes a touch pad 5 and a non-contact communication region 2a. The non-contact communication region 2a refers to a region in which non-contact communication between the information processing apparatus 1 and an apparatus to be communicated can be performed when the apparatus to be communicated approaches that region. The apparatus to be communicated will be described later. The details of the non-contact communication region 2a will be also described later. The display section 3 includes a display 6.

Next, the description will be made of the inner structure of the main body section 2.

Figure 4:
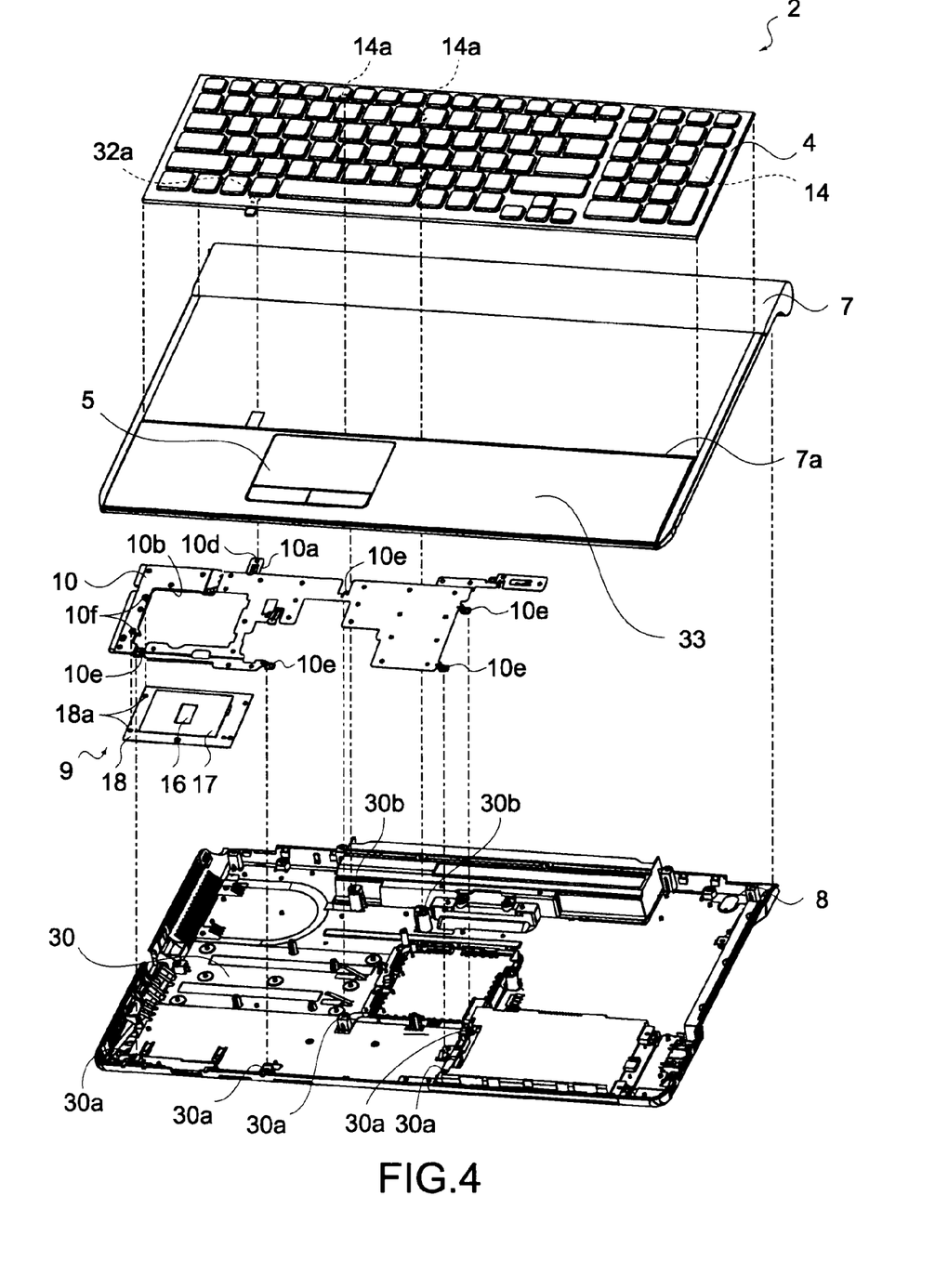
FIG. 4 is an exploded perspective view of a main body section of the information processing apparatus according to the first embodiment.

FIG. 4 is an exploded perspective view of the main body section 2. As shown in FIG. 4, the main body section 2 includes an upper housing portion 7 and a lower housing portion 8. The upper housing portion 7 and the lower housing portion 8 are coupled to each other, to thereby form a housing of the main body section 2. The upper housing portion 7 is a portion on a side of the main body section 2, on which the keyboard portion 4 is provided. The lower housing portion 8 is a portion on a side opposite to the above-mentioned side of the main body section 2. The upper housing portion 7 includes an opening 7a. The opening 7a is closed when the keyboard portion 4 is fixed therein.

The main body section 2 accommodates an antenna unit 9, an upper housing shield plate 10, and a lower housing shield plate 30. The upper housing shield plate 10 corresponds to a connection portion. Further, the information processing apparatus 1 accommodates various electronic parts being typical components for a computer. The electronic parts include a main memory including a CPU (Central Processing Unit), a GPU (Graphics Processing Unit), and a RAM (Random Access Memory), a storage device including an HDD (Hard disk drive) and an SSD (Solid State Drive), and a device for network communication.

Figure 5:
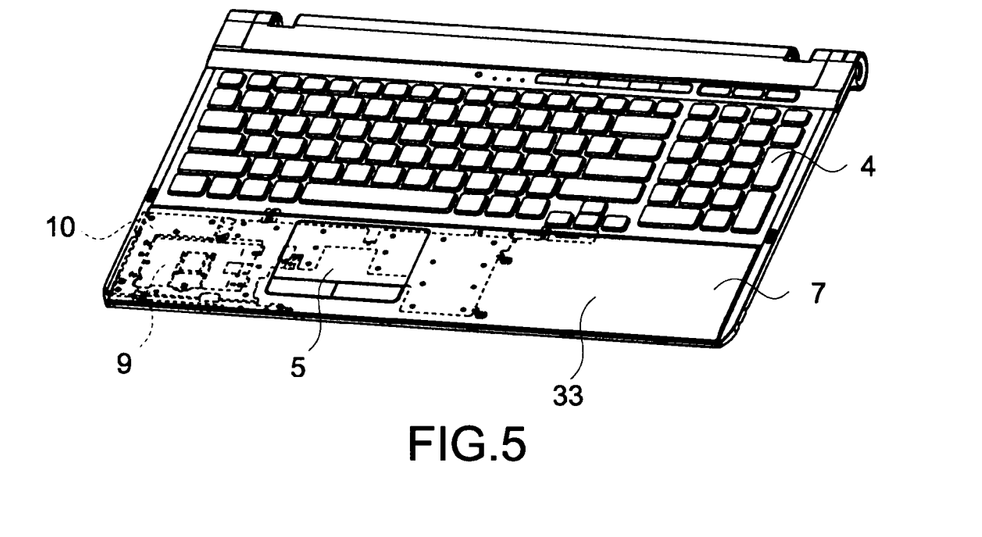
FIG. 5 is a perspective view of the main body section of the information processing apparatus according to the first embodiment.

FIG. 5 is a perspective view showing positions in which the antenna unit 9 and the upper housing shield plate 10 are incorporated to the upper housing portion 7. In FIG. 5, the upper housing shield plate 10 and the antenna unit 9 are arranged on the back side of the palm rest portion 33 of the upper housing portion 7. Thus, a region of the palm rest portion 33, which corresponds to the incorporated antenna unit 9, serves as the above-mentioned non-contact communication region 2a.

The description will be made of the keyboard portion 4.

Figure 6:
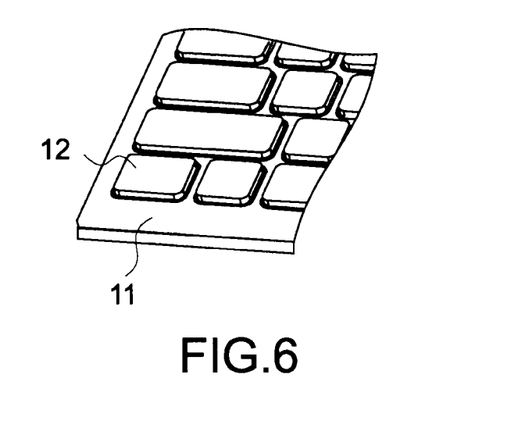
FIG. 6 is a perspective view of a part of a keyboard portion of the information processing apparatus according to the first embodiment.
Figure 7:
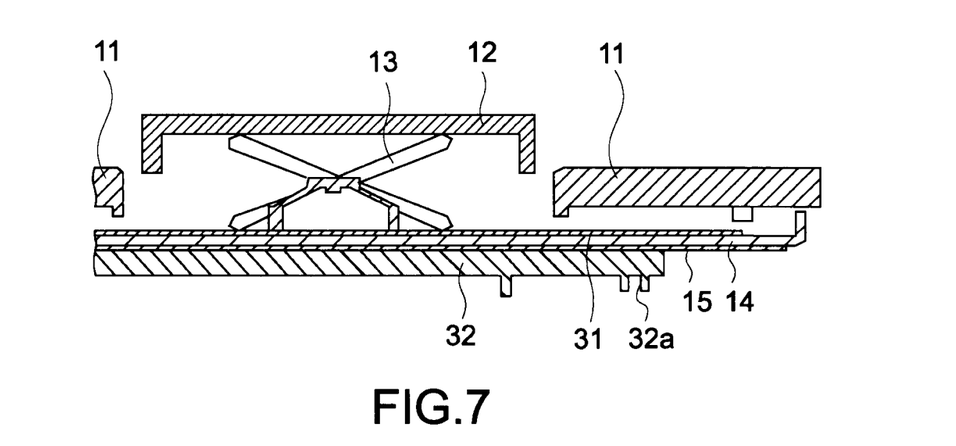
FIG. 7 is a sectional view of the keyboard portion of the information processing apparatus according to the first embodiment.

FIG. 6 is a perspective view in which a part of the keyboard portion 4 is enlarged. FIG. 7 is a sectional view of a part of the keyboard portion 4. As shown in the above-mentioned drawings, the keyboard portion 4 includes a panel 11, key tops 12, key switch mechanisms 13, a keyboard base metal plate 14, an electrically conductive drip-proof sheet 15, a wiring film 31, and a keyboard base plate 32. The keyboard base metal plate 14 corresponds to a reinforcing member. The keyboard base plate 32 serves as a base plate of the keyboard portion 4, and is a member to support the keyboard portion 4. To the keyboard base plate 32, the upper housing shield plate 10 is fixed with a screw. In FIG. 4, a screw hole 32a into which the screw is inserted is shown.

On the keyboard base plate 32, the electrically conductive drip-proof sheet 15, the keyboard base metal plate 14, and the wiring film 31 are stacked in the stated order. On the wiring film 31, via the key switch mechanisms 13, the key tops 12 are arranged. It should be noted that the key tops 12 are individually exposed through holes formed in the panel 11. The panel 11 serves to fill gaps between the key tops 12. The key switch mechanisms 13 and the key tops 12 correspond to the keyboard portion.

The keyboard base metal plate 14 is a member to ensure a mechanical strength of the keyboard portion 4. The keyboard base metal plate 14 is coupled via the lower housing shield plate 30 to the lower housing portion 8 with screws. In FIG. 4, one of screw holes 14a into which the screws are inserted is shown. The electrically conductive drip-proof sheet 15 is a sheet to prevent the liquid from dripping through the gaps between the key tops 12 and the like.

The description will be made of the antenna unit 9.

Figure 8:
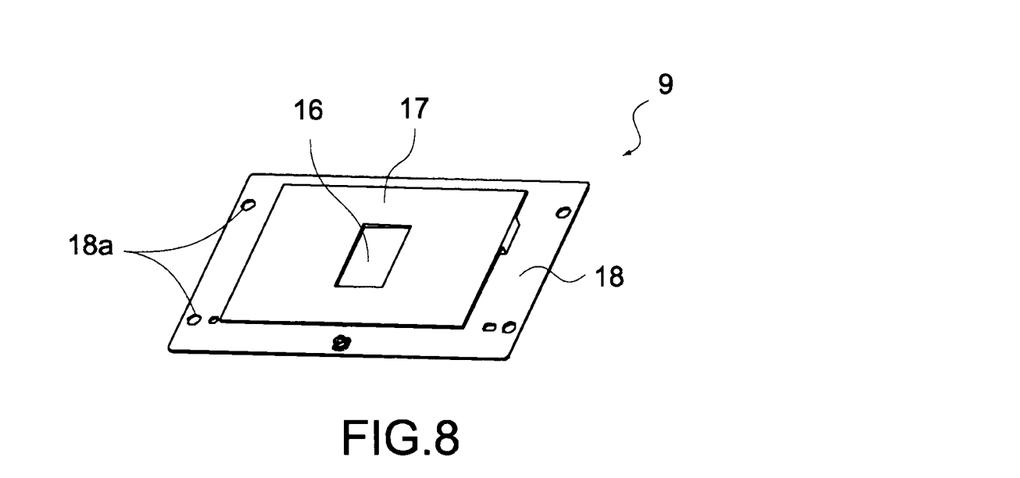
FIG. 8 is a perspective view of an antenna unit of the information processing apparatus according to the first embodiment.

FIG. 8 is a perspective view of the antenna unit 9. As shown in FIG. 8, the antenna unit 9 includes a first antenna module 16, a second antenna module 17, and an antenna module base plate 18. The first antenna module 16 and the second antenna module 17 are provided on the antenna module base plate 18. The second antenna module 17 has a flat plate shape and includes an aperture formed in the central portion thereof. In the aperture, the first antenna module 16 having a flat plate shape is arranged. The antenna module base plate 18 is fixed to the upper housing shield plate 10 with screws. In FIG. 8, screw holes 18a into which the screws are inserted are shown.

In the following, the first antenna module 16 will be generally described. The apparatus to be communicated for the first antenna module 16 is an electronic apparatus installing an antenna module having the same mechanism as that of the first antenna module 16. The apparatus to be communicated for the first antenna module 16 is, for example, a digital camera, a portable music player, or the like. The first antenna module 16 performs non-contact communication using an induced electric field with respect to the antenna module installed in the apparatus to be communicated, which has the same mechanism, when the above-mentioned antenna module approaches.

Figure 9:
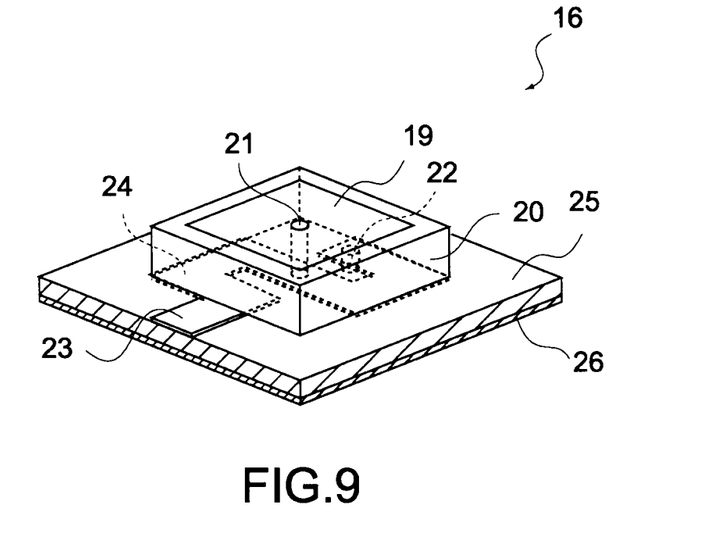
FIG. 9 is a perspective view of a first antenna module of the information processing apparatus according to the first embodiment.

FIG. 9 is a diagram showing a schematic configuration of the first antenna module 16. As shown in FIG. 9, the first antenna module 16 includes an antenna electrode 19, a dielectric body 20, a first through-hole 21, a second through-hole 22, a signal line 23, a resonance stub 24, a substrate 25, and a ground 26. Further, the first antenna module 16 incorporates a control circuit (not shown). In one surface of the substrate 25, the signal line 23 and the resonance stub 24 are formed. In the other surface of the substrate 25, the ground 26 is provided. On the resonance stub 24, the dielectric body 20 is stacked. On the dielectric body 20, the antenna electrode 19 is formed. The first through-hole 21 extends through the dielectric body 20, and is filled with an electrically conductive material. In this manner, the first through-hole 21 connects the antenna electrode 19 and the resonance stub 24 to each other. It should be noted that the first through-hole 21 is formed in the center of the antenna electrode 19 so as to extend in a direction perpendicular to the antenna electrode 19. The second through-hole 22 extends through the substrate 25, and is filled with an electrically conductive material. In this manner, through the second through-hole 22, the resonance stub 24 and the ground 26 are connected to each other.

Figure 10:
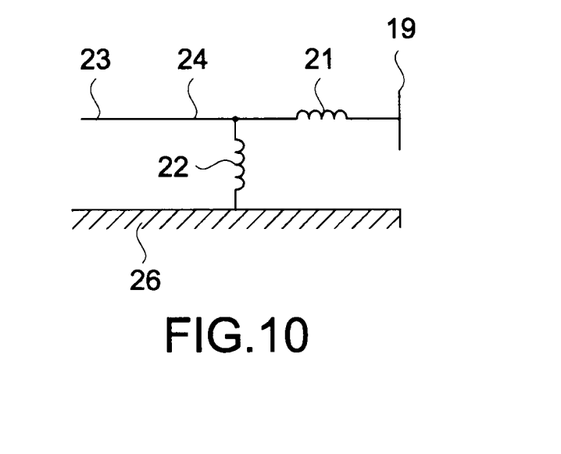
FIG. 10 is a circuit diagram of the first antenna module of the information processing apparatus according to the first embodiment.

FIG. 10 is a circuit diagram of the first antenna module 16. As shown in FIG. 10, the signal line 23 and the resonance stub 24 are connected to each other. The resonance stub 24 and the antenna electrode 19 are connected to each other through the first through-hole 21 acting as a series inductor. Further, the resonance stub 24 and the ground 26 are connected to each other through the second through-hole 22 acting as a parallel inductor. The signal line 23, the resonance stub 24, the first through-hole 21, and the antenna electrode 19 constitutes a transmission line.

The description will be made of the operation of the first antenna module 16.

In the first antenna module 16, a signal used for the communication is, for example, a UWB (Ultra Wide Band) signal with 4.48 GHz. By using the UWB signal, it is possible to perform the non-contact communication at high speed and low consumed power.

In a case where data is sent from the first antenna module 16 to the apparatus to be communicated, the sent data is input into the control circuit in the information processing apparatus 1. The sent data is demodulated into the UWB signal in the control circuit, and is supplied to the signal line 23.

The UWB signal supplied to the signal line 23 passes through the resonance stub 24 and the first through-hole 21, and then arrives the antenna electrode 19. In this case, in general, the field formed by the wireless antenna is a radiated electric field, an induced electric field, or a static electric field. In the first antenna module 16, the first through-hole 21 is formed in the center of the coupling electrode so as to extend in the direction perpendicular to the antenna electrode 19, and hence the induced electric field being a longitudinal wave peaks and the radiated electric field being a traverse wave is suppressed.

The description will be made of a case where the antenna module (hereinafter, referred to as opposed antenna module) of the apparatus to be communicated is opposed to the first antenna module 16. Due to the induced electric field formed by the antenna electrode 19, an electric field coupling is provided between the antenna electrode 19 and the antenna electrode 19 (hereinafter, referred to as opposed coupling electrode) of the opposed antenna module, and there, the UWB signal is sent and received. Here, due to the series inductor formed by the first through-hole 21, the characteristic impedance of the first antenna module 16 and the characteristic impedance of the opposed antenna module are matched with each other, and hence the signal is prevented form being reflected due to the miss-alignment of the impedance. In addition, due to the parallel inductor formed by the second through-hole 22, the transmission line and the ground 26 are connected to each other, and hence an impedance converter circuit is formed. Thus, as compared to an input current to the antenna electrode 19, an output current of the opposed coupling electrode is amplified. That is, due to the connection between the transmission line and the ground 26, a larger induced electric field is induced, and the transmission efficiency is improved.

Meanwhile, in a case where the opposed antenna module is not opposed to the first antenna module 16, the characteristic impedance of the first antenna module 16 and the input impedance are not matched with each other, and hence the UWB signal is reflected in the first antenna module 16, and is not reflected to the outside. Therefore, it is possible to suppress the consumed power without the opposed antenna module.

In a case where the information processing apparatus 1 receives the data from the apparatus to be communicated, when the signal line 23 outputs the UWB signal, the UWB signal is demodulated in the control circuit. Then, the received data is output to the information processing apparatus 1.

Figure 11:
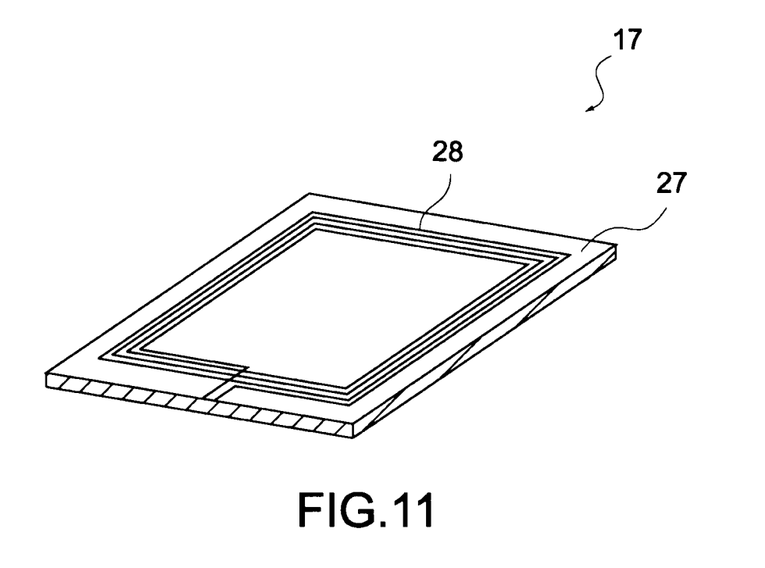
FIG. 11 is a perspective view of a second antenna module of the information processing apparatus according to the first embodiment.

Next, the second antenna module 17 will be generally described. The apparatus to be communicated of the first antenna module 16 installs an antenna coil and a control element such as an IC (Integrated Circuit). Otherwise, the apparatus to be communicated of the first antenna module 16 is an electronic apparatus installing a storage element such as an EEPROM (Electrically Erasable Read Only Memory), for example, an IC card or an IC tag. The second antenna module 17 performs, when the antenna coil installed in the apparatus to be communicated approaches, the non-contact communication using the radiated electric field with respect to the antenna coil.

FIG. 11 is a diagram showing a schematic configuration of the second antenna module 17. As shown in FIG. 11, a wire is wound in a planar shape on a substrate 27 so as to form an antenna coil 28. Further, in the second antenna module 17, a control circuit (not shown) is installed. The antenna coil 28 is connected to the control circuit.

The description will be made of the operation of the second antenna module 17.

In the second antenna module 17, a signal used for the communication is, for example, a high-frequency signal with 13.56 MHz.

In a case where the communication is performed between the second antenna module 17 and the apparatus to be communicated, a high-frequency signal is generated by the control circuit in the information processing apparatus 1, and then is supplied to the antenna coil 28. Due to the current of high-frequency signals passing through the antenna coil 28, a radiated electric field is formed. In a case where the apparatus to be communicated is opposed to the second antenna module 17, an induced electric current is generated in an antenna coil of the apparatus to be communicated (hereinafter, referred to as opposed antenna coil). Due to the induced electric current, the control element, the storage element, and the like, which are installed in the apparatus to be communicated are driven. The control element extracts high frequency band components of the high-frequency signal. In a case where the demodulated signal is a written command, demodulated data is stored in the storage element.

In a case where the demodulated signal is a reading command, data corresponding to the reading command is read by the control element from the data installed in the storage element, and is demodulated into a high-frequency signal. Due to the current of high-frequency signals passing through the opposed antenna coil, a radiated electric field is formed. By the antenna coil 28, an induced electric current being high-frequency signals is generated from the radiated electric field. The high-frequency signals are demodulated by the control circuit, and the data is output to the information processing apparatus 1.

As described above, in the first antenna module 16 and the second antenna module 17, the frequency and the kind of the electric field used for the communication are different. Therefore, the first antenna module 16 and the second antenna module 17 do not interfere with each other, and hence the first antenna module 16 and the second antenna module 17 can be arranged adjacent to each other. In this embodiment, the first antenna module 16 and the second antenna module 17 are integrally formed as the antenna unit 9. The antenna unit 9 is fixed to the upper housing shield plate 10 in such a manner that the antenna module base plate 18 is fixed to the upper housing shield plate 10 with the screws. The ground 26 of the first antenna module 16 is conductively connected to the antenna module base plate 18, and the ground 26 is connected via the antenna module base plate 18 to the upper housing shield plate 10.

The description will be made of the upper housing shield plate 10.

Figure 12A:
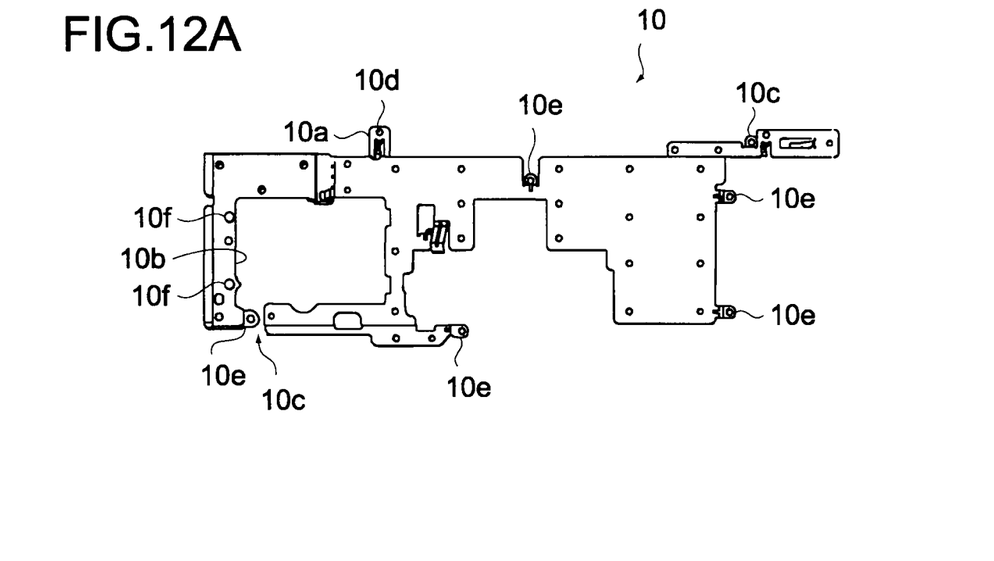
FIG. 12 are plan views each showing an upper housing shield plate of the information processing apparatus according to the first embodiment.
Figure 12B:
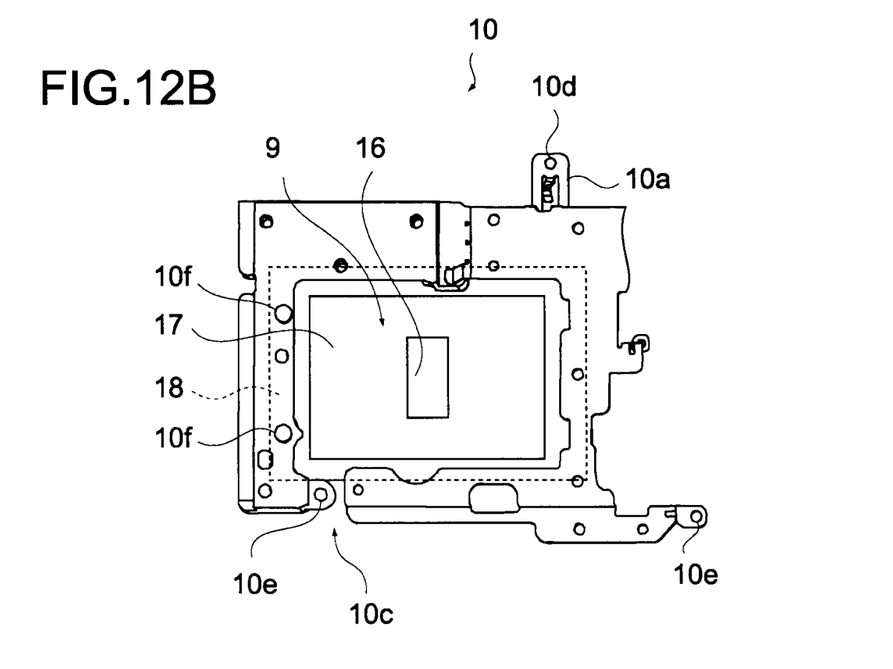

FIGS. 12A and 12B are views each showing the upper housing shield plate 10. FIG. 12A is a plan view of the upper housing shield plate 10. FIG. 12B is a plan view of the upper housing shield plate 10 and the antenna unit 9 attached to the upper housing shield plate 10.

The upper housing shield plate 10 is made of a flat-plate shaped metal, and is an electromagnetic shield to shut out an unnecessary radiation radiating from the electronic parts accommodated in the main body section 2. As shown in FIG. 12A, in the upper housing shield plate 10, there are provided a keyboard-connecting portion 10*a* and an antenna opening portion 10*b*.

As shown in FIG. 12B, the antenna opening portion 10*b* is formed so as to have a shape larger than that of the second antenna module 17 of the antenna unit 9 when viewed from the upper housing portion 7. When the antenna opening portion 10*b* is formed in the upper housing shield plate 10, a substantially loop shaped portion partially surrounding the periphery of the antenna unit 9 is formed in the upper housing shield plate 10. In this case, in the upper housing shield plate 10, a cutout portion 10*c* is formed. The cutout portion 10*c* is formed by cutting out a part of the loop shaped portion in such a manner that the loop shaped portion entirely surrounds the periphery of the antenna unit 9.

The keyboard-connecting portion 10*a* is formed so as to protrude from the upper housing shield plate 10 to abut against the electrically conductive drip-proof sheet 15 of the keyboard portion 4. The keyboard-connecting portion 10*a* has a screw hole 10*d* formed therein to communicate to the screw hole 32*a* of the keyboard base plate 32. Further, in the upper housing shield plate 10, there are formed five screw holes 10*a* used for connection to the lower housing portion 8 and two screw holes 10*f* used for connection to the antenna module base plate 18.

The description will be made of the lower housing shield plate 30.

As shown in FIG. 4, the lower housing shield plate 30 is made of a flat-plate shaped metal, and is an electromagnetic shield to shut out an unnecessary radiation radiating from the electronic parts accommodated in the main body section 2. In the lower housing shield plate 30, there are formed five screw holes 30a to each communicate to the screw holes 10a of the upper housing shield plate 10, and two screw holes 30b to each communicate to the two screw holes 14a of the keyboard base metal plate 14.

The description will be made of the connection relation between the components of the main body section 2.

Figure 13A:
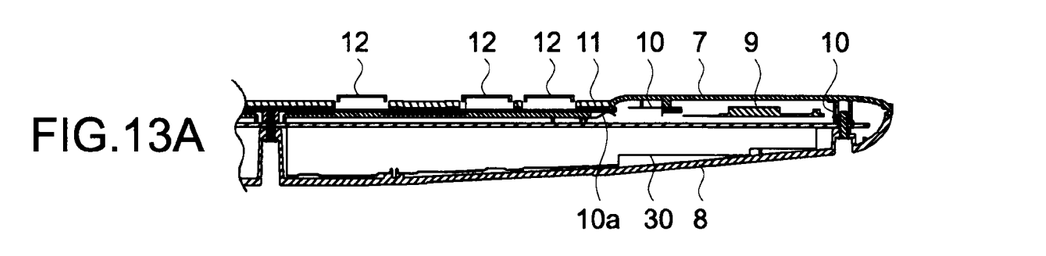
FIG. 13 are sectional views showing a connection relation between components of the information processing apparatus according to the first embodiment.
Figure 13B:
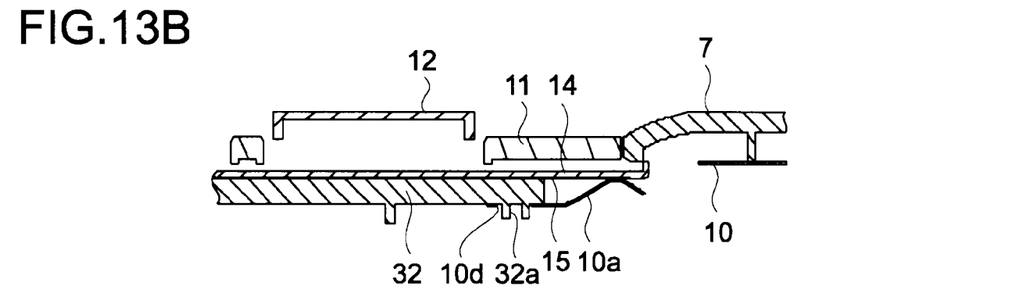

FIGS. 13A and 13B are views each showing the connection relation with respect to the main body section 2. Specifically, FIGS. 13A and 13B are views each showing the connection relation with respect to the keyboard-connecting portion 10a. FIG. 13A is a sectional view of the main body section 2, and FIG. 13B is an enlarged view of FIG. 13A. As shown in FIGS. 13A and 13B and FIG. 4, the respective components are fixed by screwing with screws. It should be noted that the lower housing portion 8 includes screw holes (not shown) at positions corresponding to the screw holes 30a and the screw holes 30b of the lower housing shield plate 30.

The antenna unit 9 is fixed to the upper housing shield plate 10 in such a manner that the screws are inserted into the screw holes 18a formed in the antenna module base plate 18 and the screw holes 10f formed in the upper housing shield plate 10. As described above, the ground 26 of the first antenna module 16 is conductively connected to the antenna module base plate 18. Therefore, the ground 26 is conductively connected via the antenna module base plate 18 to the upper housing shield plate 10.

The upper housing shield plate 10 provided with the antenna unit 9 is fixed to the keyboard portion 4 in such a manner that the screws are inserted into the screw hole 10d and the screw hole 32a of the keyboard base plate 32. Further, in this manner, as shown in FIG. 13B, the keyboard-connecting portion 10a abuts against the electrically conductive drip-proof sheet 15 due to an elastic force. In this manner, the ground 26 is conductively connected via the antenna module base plate 18 and the upper housing shield plate 10 to the keyboard base metal plate 14 and the electrically conductive drip-proof sheet 15.

The keyboard portion 4 provided with the antenna unit 9 and the upper housing shield plate 10 is fixed to the lower housing shield plate 30 in such a manner that the screws are inserted into the screw holes 14a and the screw holes 30b of the lower housing shield plate 30, and further, the screws are inserted into the screw holes 10a of the upper housing shield plate 10 and the screw holes 30a of the lower housing shield plate 30. In this case, the screws are inserted into holes (not shown) formed in the lower housing portion 8.

In the above-mentioned manner, the antenna unit 9, the upper housing shield plate 10, the keyboard portion 4, and the lower housing shield plate 30 are coupled to each other, and hence the ground 26 of the first antenna module 16 is electrically connected to the upper housing shield plate 10, the keyboard base metal plate 14, the electrically conductive drip-proof sheet 15, and the lower housing shield plate 30.

As described above, in the first antenna module 16, the transmission line is connected through the parallel inductor to the ground 26. As a result, the impedance converter circuit is formed, and the output current of the opposed coupling electrode is amplified as compared to the input current to the antenna electrode 19. That is, due to the connection between the transmission line and the ground 26, the larger induced electric field is induced and the transmission efficiency is improved. In the information processing apparatus 1 according to this embodiment, a ground area for the first antenna module 16 is increased because both of the keyboard base metal plate 14 and the electrically conductive drip-proof sheet 15 serves as the ground. Thus, it is possible to further improve the transmission efficiency.

In addition, in the second antenna module 17, the data is sent and received by using the radiated electric field. Here, if an electric conductor exists in the circumference of the second antenna module, an eddy current is generated in the electric conductor due to radiated electric field, and the inductance between the antenna coil 28 and the electric conductor becomes smaller. Thus, the resonance frequency of the antenna coil 28 is varied. The above-mentioned variation is significant particularly in a case where the electric conductor forms a loop in the circumference of the antenna coil 28. In contrast, in this embodiment, the cutout portion 10c prevents the upper housing shield plate 10 from forming a loop, and hence it is possible to prevent the resonance frequency of the second antenna module 17 from being varied due to the upper housing shield plate 10.

The present invention is not limited to the above-mentioned embodiment, and various modifications thereof can be made without departing from the gist of the present invention.

Although the description has been made of the information processing apparatus 1 including the first antenna module 16 and the second antenna module 17, the present invention is not limited thereto. It is also possible that the information processing apparatus 1 includes only the first antenna module 16. In this case, it is unnecessary to form the cutout portion 10c in the upper housing shield plate 10.

Although the description has been made of the keyboard-connecting portion 10a of the upper housing shield plate 10 abutting against the electrically conductive drip-proof sheet 15, the keyboard-connecting portion 10a of the upper housing shield plate 10 may abut against the keyboard base metal plate 14. Even in this case, the keyboard base metal plate 14 and the electrically conductive drip-proof sheet 15 function as the ground for the first antenna module 16.

Although the description has been made of the keyboard-connecting portion 10a of the upper housing shield plate 10 abutting against the electrically conductive drip-proof sheet 15 due to the elastic force, the invention is not limited thereto. For example, it is also possible that the keyboard-connecting portion 10a is fixed to the keyboard base metal plate 14 by screwing.

The present application contains subject matter related to that disclosed in Japanese Priority Patent Application JP 2009-298873 filed in the Japan Patent Office on Dec. 28, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   a keyboard portion including
   a base plate to support a plurality of key portions, and
   an electrically conductive metal plate to be stacked on the base plate and to reinforce the base plate;
   a first antenna module including
   an antenna electrode to generate an induced electric field and including a first through hole at a center of the antenna electrode,
   a signal line and resonance stub formed on a substrate, the resonance stub having a second through hole,
   a dielectric body disposed on the signal line and resonance stub a ground portion formed at a side of the substrate opposite the signal line and resonance stub, a first connection portion to electrically connect the antenna electrode to the resonance stub via the first through hole and through the dielectric body, and a second connection portion to electrically connect the resonance stub and the ground portion to the electrically conductive metal plate and to the base plate.

2. An information processing apparatus according to claim 1, wherein the second connection portion includes an antenna module base plate having an electric conductivity to support the first antenna module, and a shield plate to shut out unnecessary radiation.

3. An information processing apparatus according to claim 2, further comprising a second antenna module including an antenna coil to generate a radiated electric field, wherein the first antenna module and the second antenna module are integrated to each other as an antenna unit and are provided on the antenna module base plate, and wherein the shield plate includes an opening to be opposed to the antenna unit, and a cutout portion that forms a loop portion that partially surrounds an outer peripheral portion of the opening.

4. An information processing apparatus according to claim 3, wherein the first antenna module performs communication with a main frequency band of 4.48 GHz.

5. The information processing apparatus according to claim 1, further comprising:

a main body to house the keyboard portion, the main body including a palm rest portion, wherein the first antenna module is positioned in the palm rest portion of the main body.

6. The information processing apparatus according to claim 3, wherein the second antenna module performs communication with a main frequency band of 13.56 MHz.

7. The information processing apparatus according to claim 3, wherein the antenna coil of the second antenna module is wound on a substrate as a planar coil.

8. An information processing apparatus, comprising:

a keyboard portion including a base plate to support a plurality of key portions, an electrically conductive metal plate to be stacked on the base place and to reinforce the base plate, and an electrically conductive drip-proof sheet to be located between the base plate and the electrically conductive metal plate and prevent liquid drops from dripping from the plurality of key portions;

a first antenna module including an antenna electrode to generate an induced electric field and including a first through hole at a center of the antenna electrode, a signal line and resonance stub formed on a substrate, the resonance stub having a second through hole, a dielectric body disposed on the signal line and resonance stub a ground portion formed at a side of the substrate opposite the signal line and resonance stub, a first connection portion to electrically connect the antenna electrode to the resonance stub via the first through hole and through the dielectric body, and a second connection portion to electrically connect the resonance stub and the ground portion to the electrically conductive metal plate and to the base plate.

* * * * *